(12) United States Patent
Oyake et al.

(10) Patent No.: US 7,204,188 B2
(45) Date of Patent: Apr. 17, 2007

(54) METHOD OF MANUFACTURING STAMPER FOR MANUFACTURING INFORMATION MEDIUM, STAMPER, AND PHOTORESIST MASTER

(75) Inventors: Hisaji Oyake, Chuo-ku (JP); Hiroaki Takahata, Chuo-ku (JP); Kenji Yoneyama, Chuo-ku (JP); Yuuichi Kawaguchi, Chuo-ku (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/500,816

(22) PCT Filed: Jan. 6, 2003

(86) PCT No.: PCT/JP03/00020

§ 371 (c)(1),
(2), (4) Date: Jul. 7, 2004

(87) PCT Pub. No.: WO03/058615

PCT Pub. Date: Jul. 17, 2003

(65) Prior Publication Data

US 2005/0039621 A1    Feb. 24, 2005

(30) Foreign Application Priority Data

Jan. 8, 2002    (JP)    ............................. 2002-001775

(51) Int. Cl.
*B41F 33/00*    (2006.01)

(52) U.S. Cl. ...................................... 101/483; 101/484
(58) Field of Classification Search ................ 101/483, 101/487; 430/322–325; 425/403; 369/273
See application file for complete search history.

(56) References Cited

U.S. PATENT DOCUMENTS 4,259,433 A * 3/1981 Mizobuchi et al. ......... 430/296

(Continued)

FOREIGN PATENT DOCUMENTS

JP    A 3-180476    8/1991

(Continued)

*Primary Examiner*—Anthony H. Nguyen
(74) *Attorney, Agent, or Firm*—Oliff & Berridge, PLC

(57) ABSTRACT

A stamper with a sharp uneven pattern for manufacturing high precision information media and a method of manufacturing a stamper. The method includes (1) manufacturing a photoresist master by forming a light absorption layer and a photoresist layer on substrate, (2) forming a latent image on the photoresist layer, and an uneven pattern in the photoresist layer by developing the latent image, (3) forming a Ni thin film on the uneven pattern by electroless plating, (4) forming a Ni film on the Ni thin film, and (5) removing the Ni thin film and the Ni film from the photoresist master. The method also includes, prior to the step of forming the Ni thin film on the photoresist layer, a metal catalyst being provided on the surface of the uneven pattern, the metal catalyst being activated, and the surface of the uneven pattern being washed with ultra pure water.

5 Claims, 6 Drawing Sheets

U.S. PATENT DOCUMENTS

| | | | | |
|---|---|---|---|---|
| 4,615,969 | A * | 10/1986 | Strand | 430/320 |
| 4,666,735 | A * | 5/1987 | Hoover et al. | 427/510 |
| 4,737,447 | A * | 4/1988 | Suzuki et al. | 430/321 |
| 5,041,369 | A * | 8/1991 | Fukui et al. | 430/619 |
| 5,501,926 | A * | 3/1996 | Cheng et al. | 430/5 |
| 5,716,663 | A * | 2/1998 | Capote et al. | 156/277 |
| 6,562,550 | B2 * | 5/2003 | Takahata et al. | 430/320 |
| 6,699,643 | B2 * | 3/2004 | Asukata | 430/315 |
| 6,706,572 | B1 * | 3/2004 | Yamazaki et al. | 438/166 |
| 2001/0053120 | A1 * | 12/2001 | Sakurai et al. | 369/275.4 |
| 2002/0187266 | A1 * | 12/2002 | Izumi et al. | 427/304 |
| 2003/0087186 | A1 * | 5/2003 | Sano | 430/270.1 |
| 2003/0170564 | A1 * | 9/2003 | Kido et al. | 430/270.11 |
| 2003/0211407 | A1 * | 11/2003 | Watanabe et al. | 430/17 |
| 2003/0224084 | A1 * | 12/2003 | Nishiyama et al. | 425/403 |

FOREIGN PATENT DOCUMENTS

| | | |
|---|---|---|
| JP | A 4-263140 | 9/1992 |
| JP | A 5-214547 | 8/1993 |
| JP | A 6-215422 | 8/1994 |
| JP | A 7-147026 | 6/1995 |
| JP | A 8-273219 | 10/1996 |
| JP | A 8-283950 | 10/1996 |
| JP | A 9-109276 | 4/1997 |
| JP | A 9-292715 | 11/1997 |
| JP | A 2000-21033 | 1/2000 |
| JP | A 2001-202661 | 7/2001 |
| JP | A 2001-344831 | 12/2001 |

* cited by examiner

METHOD OF MANUFACTURING STAMPER FOR MANUFACTURING INFORMATION MEDIUM, STAMPER, AND PHOTORESIST MASTER

TECHNICAL FIELD

The present invention relates to a stamper used during the manufacture of an information medium such as an optical disc comprising an uneven pattern such as grooves and prepits, a photoresist master for manufacturing the stamper, a method of manufacturing the stamper using the photoresist master, and an information medium manufactured using the stamper.

BACKGROUND ART

Optical discs, which represent one type of information media, are currently available in two different varieties: optical recording discs which enable writing or rewriting of information, and read-only discs in which the information has been pre-recorded onto the disc.

A groove (guide channel) that is used for tracking and the like is formed in the disc substrate of an optical recording disc, and a recording layer comprising a phase change material or an organic dye material is laminated on top of the disc substrate. When the laser beam is irradiated onto the recording layer, the recording layer undergoes a chemical or physical change, thus forming a recording mark. In contrast, in the case of a read-only disc, recording marks (information pits) are formed in advance as part of an uneven pattern on the disc substrate. When a reading laser beam is irradiated onto these recording marks, the quantity of reflected light varies, and by detecting these variations, the information is able to be read (played back).

In order to manufacture a disc substrate with an uneven pattern of grooves, information pits, and the like, a stamper is used in which the negative pattern (which is itself a type of uneven pattern) of the desired uneven pattern has been formed. For example, a method of manufacturing a disc substrate by conducting injection molding using a mold with the above stamper secured inside the cavity, thereby transferring the negative pattern to the resin used to fill the cavity, is common.

A stamper with an uneven pattern is usually formed from a metal stamper containing Ni or the like. In the steps required for manufacturing this stamper, first a photoresist master with the negative pattern of the uneven pattern of the stamper is prepared, and a metal film is then formed on this photoresist master by plating. Subsequently, the metal film is separated from the photoresist master, and then subjected to a series of predetermined treatments such as surface washing to form the stamper.

As follows is a description of the manufacturing process for a photoresist master 1, with reference to the conventional photoresist master 1 shown in FIG. 7. First, a photoresist layer 4 is formed on top of a glass substrate 2. Next, the photoresist layer 4 is exposed using a patterning laser beam such as a laser, and the latent image pattern is developed. This enables the production of the photoresist master 1 with an uneven pattern 6 formed in the photoresist layer 4.

In order to use this photoresist master 1 to prepare a stamper 20 by plating, first, as shown in FIG. 8, a thin metal film 8 containing a Ni material or the like is formed on the surface of the uneven pattern 6 using a process such as electroless plating, thereby imparting conductivity to the photoresist master 1.

Subsequently, electroplating is conducted with the thin metal film 8 as a backing, thereby forming a metal film 10 containing Ni or the like. By removing the thin metal film 8 and the metal film 10 from the photoresist master 1, a stamper 20 containing the transferred uneven pattern 6 can be obtained.

In recent years, as the capacity of optical recording media has increased, uneven patterns such as grooves have become much finer, meaning errors in the pattern shape have a large effect on the recording and reading accuracy. Accordingly, it is desirable to form a sharp uneven pattern on the disc substrate, but in order to achieve this sharp pattern, the uneven pattern of the photoresist layer 4, which is the basis for the pattern, must be formed with a high level of precision (sharpness).

The minimum width of the latent image pattern formed on the photoresist layer 4 is limited by the spot diameter of the laser beam when it reaches the photoresist layer 4. When $\lambda$ is the laser wavelength, and NA is the numerical aperture of the objective lens of the irradiating optical system, then the spot diameter w is represented by the formula $w = k \cdot \lambda / NA$. k is a constant that is determined by the aperture shape of the objective lens and the intensity distribution of the incident light beam.

However, even in the case of patterns with widths that theoretically do not exceed the spot diameter limit, if the photoresist layer 4 is thin, then problems of inadequate sharpness can arise due to factors such as shallowness of the uneven pattern transferred to the stamper, or rounding of the shape of the uneven pattern (this is known as pattern sag). It is thought that these problems are caused by fluctuations occurring in the thickness of the photoresist layer 4 (this is known as film thinning) during typical exposure and developing operations. It is thought that these thickness fluctuations are caused by laser beam reflection between the photoresist layer 4 and the glass substrate 2, with this reflection causing excessive exposure of the photoresist layer 4.

The inventor of the present invention has clarified that forming a light absorption layer between the glass substrate 2 and the photoresist layer 4 is an effective way of resolving these problems. By so doing, the light absorption layer can absorb the laser beam and suppress any light reflection, and consequently a sharper exposure and development can be achieved than in a conventional process.

However, based on further research, the inventor of the present invention noticed that a photoresist master 1 with a light absorption layer displayed some problems relating to the formation of the thin metal film 8 by electroless plating. Specifically, it was surmised that a photoresist master 1 in which the light absorption layer was partially exposed was prone to increases in fine irregularities (fine defects) during the electroless plating process. In other words, it was discovered that even though the same method was used to form the thin metal film, on some occasions when the stamper was removed, for some reason or other fine irregularities (fine defects) had been formed on the surface of the uneven pattern of the stamper. During playback these fine irregularities manifest as noise, meaning that despite the attempt to improve the recording capacity by effectively utilizing a light absorption layer, in reality a decrease occurs in the recording and playback performance.

If this problem can be resolved, then the manufacture of a stamper with a sharp uneven pattern should be possible using a photoresist master with a light absorption layer. In other words, it became clear that a sharp uneven pattern that had been formed on the photoresist master through the effects of the light absorption layer, could be transferred faithfully to a stamper.

DISCLOSURE OF THE INVENTION

The present invention is directed to a solution to the above described disadvantage, and it is an object of the present invention to provide a method of manufacturing a photoresist master in which shape errors are suppressed during the electroless plating process, as well as a photoresist master, a stamper manufactured using such a photoresist master, and an information medium manufactured using such a stamper.

As a result of intensive research on methods of manufacturing information media such as optical discs and magnetic discs (discrete media), the inventor of the present invention discovered a method of forming a sharp uneven pattern on a stamper. In other words, the above object can be achieved by the present invention described below.

(1) A method of manufacturing a stamper for manufacturing an information medium, comprising the steps of: manufacturing a photoresist master by forming at least a light absorption layer and a photoresist layer, in that order, on top of a substrate, irradiating light onto said photoresist layer to form a latent image from an opposite surface to that which contacts said light absorption layer, and then developing said latent image to form an uneven pattern; forming a thin metal film on top of said uneven pattern of said photoresist master;

forming a stamper by forming a metal film on top of said thin metal film, and separating said thin metal film and said metal film from said photoresist master; and providing a metal catalyst on a surface of said uneven pattern, activating said metal catalyst, and then washing the surface of said uneven pattern on which said metal catalyst is provided with a liquid, as preliminary treatments to the step of forming said thin metal film on said photoresist layer.

(2) The method of manufacturing a stamper for manufacturing an information medium according to (1), wherein pure water is used as said liquid for said washing.

(3) A stamper for manufacturing an information medium, in a surface of the stamper an uneven pattern being formed in advance, the stamper being manufactured by the steps of: manufacturing a photoresist master by forming at least a light absorption layer and a photoresist layer, in that order, on top of a substrate, irradiating light onto said photoresist layer to form a latent image from an opposite surface to that which contacts said light absorption layer, and then developing said latent image to form an uneven pattern; forming a thin metal film on top of said uneven pattern of said photoresist master; forming the stamper by forming a metal film on top of said thin metal film, and separating said thin metal film and said metal film from said photoresist master; and providing a metal catalyst on a surface of said uneven pattern, activating said metal catalyst, and then washing the surface of said uneven pattern on which said metal catalyst is provided with a liquid, as preliminary treatments to the step of forming said thin metal film on said photoresist layer.

(4) The stamper according to (3), wherein pure water is used as said liquid for said washing.

(5) A photoresist master comprising a substrate, a light absorption layer laminated on top of said substrate, and a photoresist layer which is laminated on top of said light absorption layer and is capable of having an uneven pattern formed therein by forming and subsequently developing of a latent image, wherein an activated metal catalyst is provided on a surface of said uneven pattern formed in said photoresist layer, and the surface of said uneven pattern on which said metal catalyst has been provided is washed with a liquid.

(6) An information medium, in which a final uneven pattern is formed by using, as a negative pattern, an uneven pattern of a stamper manufactured by the steps of: manufacturing a photoresist master by forming at least a light absorption layer and a photoresist layer, in that order, on top of a substrate, irradiating light onto said photoresist layer to form a latent image from an opposite surface to that which contacts said light absorption layer, and then developing said latent image to form an uneven pattern; forming a thin metal film on top of said uneven pattern of said photoresist master; forming a stamper by forming a metal film on top of said thin metal film, and separating said thin metal film and said metal film from said photoresist master; and providing a metal catalyst on a surface of said uneven pattern, activating said metal catalyst, and then washing the surface of said uneven pattern on which said metal catalyst is provided with a liquid, as preliminary treatments to the step of forming said thin metal film on said photoresist layer.

(7) The information medium according to (6), wherein said final uneven pattern is formed by direct transfer of said uneven pattern from said stamper.

(8) The information medium according to (6), wherein said final uneven pattern is formed by transfer of an uneven pattern from a mother stamper, and said uneven pattern of said mother stamper is formed by transfer of said uneven pattern using said stamper as a master stamper.

(9) The information medium according to (6), wherein said final uneven pattern is formed by transfer of an uneven pattern from a child stamper, and said uneven pattern of said child stamper is formed by transfer of an uneven pattern from a mother stamper, which has been formed by transfer of said uneven pattern using said stamper as a master stamper.

The inventor of the present invention applied a metal catalyst to a photoresist master using a light absorption layer. As a result, the inventor discovered that the synergistic effect of the advantages offered by the light absorption layer and the provision of the metal catalyst enabled the formation of an uneven pattern with better sharpness than that obtainable by conventional processes. Noticing the fact that a photoresist master in which the light absorption layer is partially exposed can be prone to increases in fine irregularities (fine defects) during the electroless plating process, the inventor of the present invention investigated in further detail, and discovered that by washing the uneven pattern surface with a liquid following application of the metal catalyst, an even finer uneven pattern could be produced with even better accuracy.

The reason for this observation is thought to be as follows, although this is only conjecture.

Following application of the metal catalyst, during removal of Sn using an accelerator, the accelerator penetrates into the partially exposed light absorption layer, reaching as far as the glass substrate surface. At this point, the coupling agent layer that is normally applied to the surface of the glass substrate undergoes some form of reaction with the accelerator, generating a gas and causing the formation of fine irregularities. In the present invention, following the accelerator process, the accelerator is washed away by washing with a liquid, and consequently fine irregularities do not develop. As a result, the uneven pattern, which is exposed with good sharpness due to the characteristics of the light absorption layer, can be accurately reproduced in the thin metal film formed by electroless plating.

As a result, the grooves, information pits, and the like of an optical recording medium can also be formed with good sharpness, and this makes it possible to improve the recording and playback characteristics. Furthermore, because the invention is compatible with future ongoing miniaturization of uneven patterns, it also enables increases in the information memory (recording) capacity of information media.

BEST MODE FOR CARRYING OUT THE INVENTION

As follows is a detailed description of an embodiment of the present invention, based on the drawings.

Figure 1:
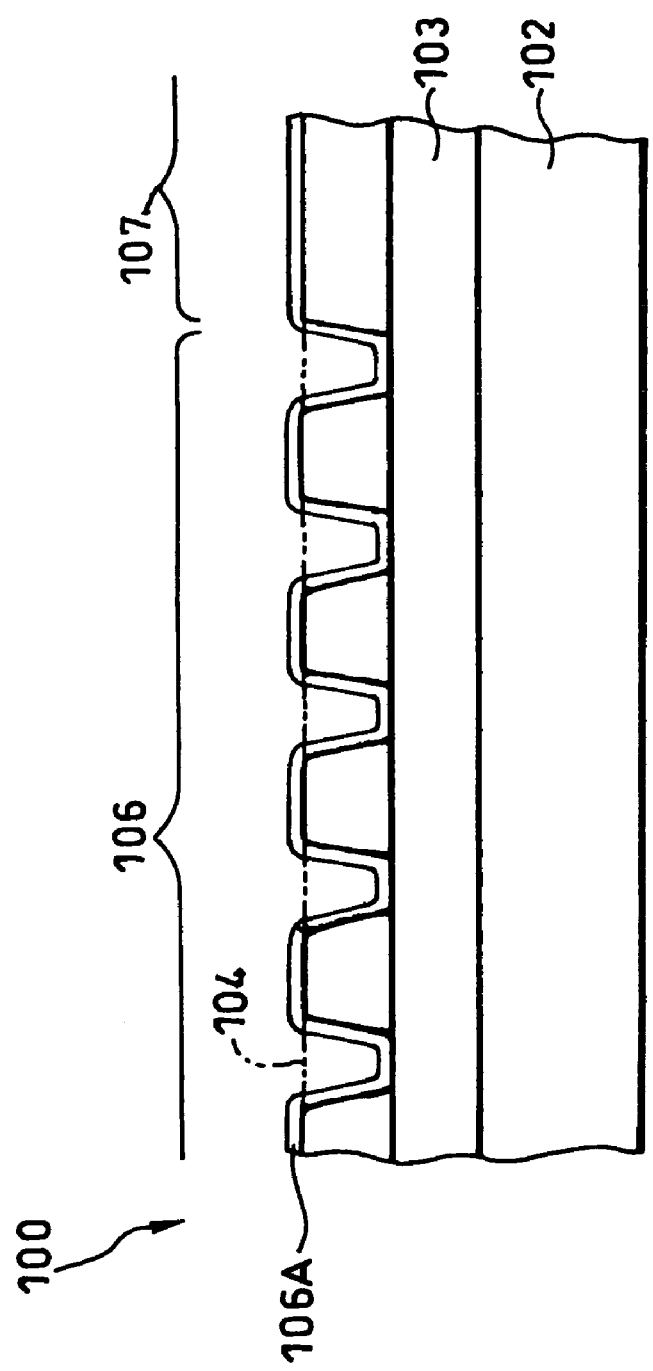
FIG. 1 is a cross-sectional view showing a photoresist master according to an embodiment of the present invention.

FIG. 1 shows a photoresist master 100 according to the embodiment of the present invention. This photoresist master 100 comprises a glass substrate 102, a light absorption layer 103 laminated on top of this glass substrate 102, and a photoresist layer 104 laminated on top of this light absorption layer 103. Incidentally, the surface of the glass substrate 102 is treated with a coupling agent or the like in order to improve the adhesion to the light absorption layer. A latent image of an uneven pattern is formed on the photoresist layer 104, on the opposite side from the light absorption layer 103 (the top side in FIG. 1), by exposure with a patterning laser beam, and development of this latent image causes the removal of a portion of the photoresist layer, forming an uneven pattern 106. Following developing, portions of the light absorption layer 103 are exposed at the bottom surfaces of the concave sections of the uneven pattern 106. The numeral 107 in FIG. 1 shows a non-uneven area in which the uneven pattern has not been formed.

As described below, the aforementioned uneven pattern 106 becomes the pattern surface 206 of a stamper 120. Furthermore, the area in which the uneven pattern has not been formed becomes the mirror surface 207 of the stamper 120. During exposure, the patterning laser beam is absorbed by the light absorption layer 103, thereby suppressing light reflection and enabling the formation of fine unevennesses with good sharpness.

Pd (106A) is provided on the surface of the uneven pattern 106 of the photoresist master 100. Specifically, a metal catalyst (a Pd—Sn compound) is adsorbed onto the surface of the uneven pattern 106, and an accelerator is used to activate the catalyst and remove only the Sn, leaving the Pd deposited on the surface of the uneven pattern 106. Subsequently, the surface of the uneven pattern 106 on which the Pd has been provided is washed with a liquid. Specifically, by washing the surface of the uneven pattern 106 with pure water, and preferably with ultra pure water, the development of fine irregularities can be suppressed. The flow rate of the ultra pure water is preferably at least 1 l/min, and even more preferably 5 l/min or greater. In this embodiment a Pd-Sn compound was used as the metal catalyst, but the present invention is not limited to this case, and other metal catalysts may also be used.

Furthermore, in FIG. 1, the Pd (106A) is shown schematically as a thin film, but this does not represent the actual state of the Pd.

Figure 2:
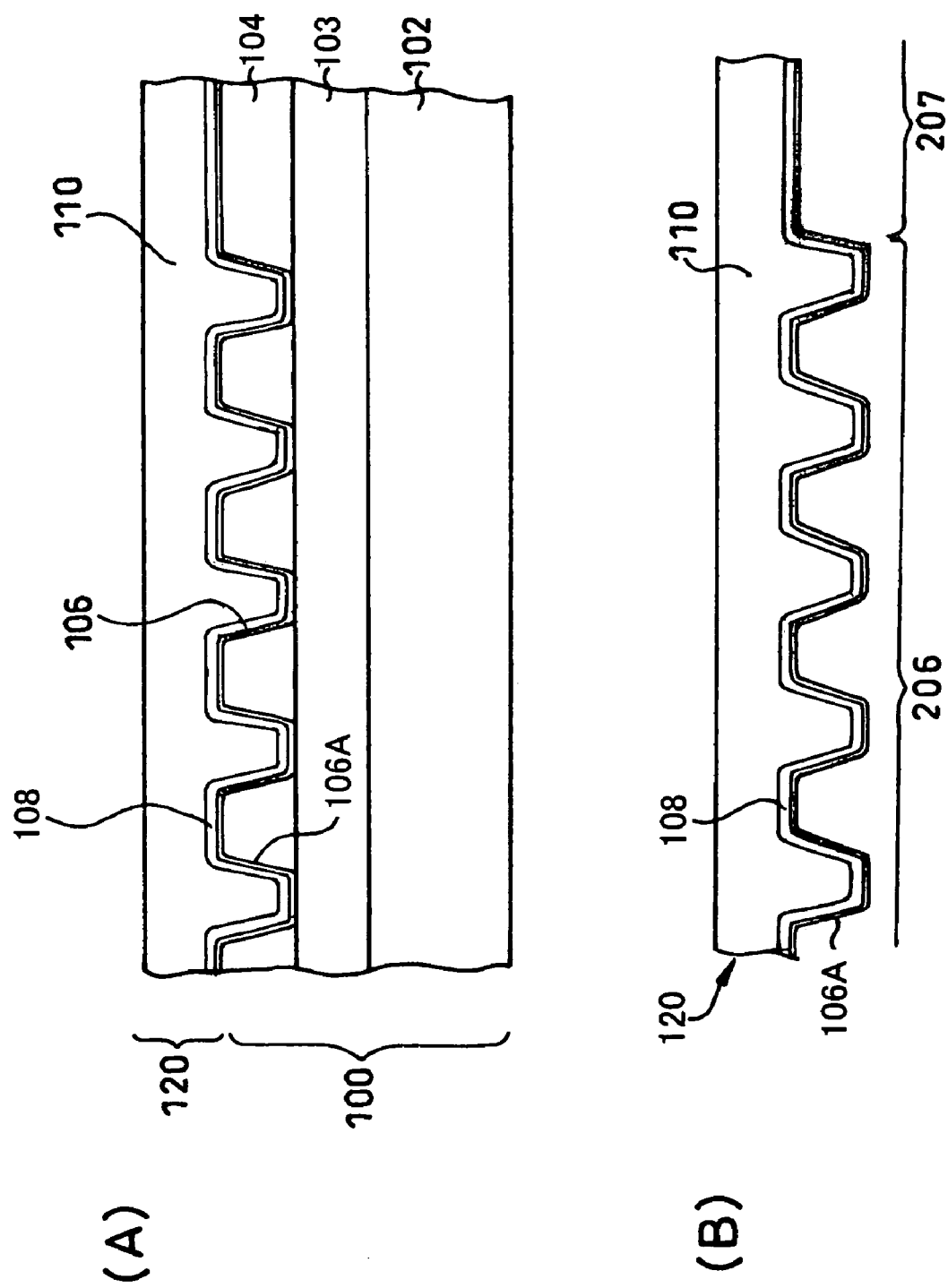
FIG. 2(A) is a cross-sectional view showing a state during the manufacture of a stamper using the same photoresist master.
FIG. 2(B) is a cross-sectional view showing the manufactured stamper.

FIG. 2(A) shows the stamper 120 formed using the above photoresist master 100.

In this formation process, first electroless plating is used to form a Ni thin film 108 on the surface of the uneven pattern 106 on which the Pd has been deposited.

During this formation, a reducing agent in the plating solution is oxidized at the Pd surface, which possesses catalytic activity, and emits an electron, and this electron reduces a Ni ion in the solution, enabling the Ni thin film 108 to effectively conform to, and follow the uneven pattern 106. In this embodiment, adequate quantities of Pd are also provided within the concave sections of the uneven pattern 106, meaning the Ni thin film 108 can be formed in a manner that faithfully follows the uneven pattern 106.

Subsequently, a current is passed through the surface, using the Ni thin film 108 as a backing, and electroplating is carried out to form a Ni film 110. If the Ni thin film 108 and the Ni film 110 are then removed from the photoresist master 100, then as shown in FIG. 2(B), a stamper 120 comprising an accurately transferred uneven pattern 106 can be obtained. At this point, the aforementioned Pd (106A) remains bonded to the Ni thin film 108.

In this stamper 120, the pattern surface 206 is formed in the area corresponding with the uneven pattern 106, and the mirror surface 207 is formed in the area corresponding with the non-uneven area 107.

Although not specifically shown in the drawings, the stamper 120 can then be installed in a mold, and injection molding or the like is used to manufacture an optical disc substrate having a final uneven pattern which is created by transferring the uneven pattern as a negative pattern. In addition to using the stamper 120 to manufacture optical disc substrates, the stamper 120 can also be used as a master stamper for preparing a mother stamper by an electroforming process, and this mother stamper can then be used to manufacture optical discs.

In addition, this mother stamper could also be used as a master for preparing a child stamper, and this child stamper can then be used to manufacture the optical discs. In other words, the stamper 120 of the present invention need not necessarily be used directly for the manufacture of optical discs, but may also be used indirectly for such optical disc manufacture, as the master stamper used in the preparation of a mother stamper or the like.

In the photoresist layer 104 of this embodiment, the provision of the light absorption layer 103 enables a well defined latent image to be projected, thus enabling a sharp uneven pattern 106 to be produced. In addition, because Pd is applied to the uneven pattern 106 and the surface is then washed as preliminary treatments preceding the electroless plating, a precise Ni thin film 108 that conforms to the shape of the uneven pattern 106 can be formed. In other words, the advantages provided by the light absorption layer 103 are utilized to their maximum effect.

The synergistic effect between the light absorption layer 103 and the applied Pd enables the sharp uneven pattern 106 to be transferred to the stamper 120 with good retention of this sharpness, and as a result, sagging of the uneven pattern formed on the stamper 120 is suppressed. Moreover, the surface of the uneven pattern transferred to the stamper 120 is smoother than that obtained in conventional processes, and the number of fine irregularities (fine defects) is markedly reduced. By using this stamper 120, optical recording media with suppressed noise levels and good levels of recording and reading (playback) accuracy can be produced.

Furthermore, even in those cases where exposure is stopped prior to exposure of the light absorption layer, a synergistic effect is still obtained due to the applied Pd and the light absorption layer, and consequently the sharp uneven pattern is able to be transferred to the stamper with good retention of this sharpness, in a similar manner to that described above.

In addition, in the present embodiment only the case involving a Ni plating treatment was described, but the present invention is not restricted to this case, and other metal plating can also be used.

Furthermore, the stamper described above is applicable not only to optical discs, but can also be applied generally to the manufacture of information media, including magnetic discs (discrete media).

EXAMPLES

Example: Stamper No. 1

Following formation of a layer of a coupling agent on top of a polished glass substrate, a light absorption layer was formed by spin coating. The application liquid used was SWK-T5D60 (manufactured by Tokyo Ohka Kogyo Co., Ltd.) containing 4,4'-bis(diethylamino)benzophenone as a light absorption agent. The applied layer was baked at 200° C. for 15 minutes to cure the layer and remove residual solvent, thus forming a light absorption layer of 140 nm in thickness. Subsequently, a photoresist (DVR100, manufactured by Zeon Corporation) was spin coated onto the light absorption layer, and residual solvent was vaporized by baking, thus forming a photoresist layer of 25 nm in thickness.

Subsequently, using a cutting machine manufactured by Sony Corporation, and targeting the formation of a groove pattern with a track pitch of 320 nm and a groove width of 150 nm, the photoresist layer was exposed with a Kr laser (wavelength=351 nm) and subsequently developed to form an uneven pattern, thus producing a photoresist master.

Following activation of the surface of the photoresist layer of this photoresist master using a surfactant, a catalyst (a Pd, Sn colloid) was applied as a preliminary treatment to electroless plating. An accelerator ($HBF_4$ solution) was then used to remove the Sn and achieve deposition of the Pd onto the photoresist surface, and the uneven pattern surface was then washed with ultra pure water (flow rate: 12 l/min) thus completing the preparation for electroless plating.

The photoresist master was then immersed in a $NiCl_2$ solution, and a Ni thin film was formed by electroless plating. Electroplating was then conducted with this Ni thin film as a backing, thus forming a Ni film. The laminate formed from this Ni thin film and the Ni film was separated from the master, the rear surface was polished, and the surface was washed, thus completing production of a stamper No. 1.

Comparative Example: Stamper No. 2

With the exception of not performing the water washing step, a stamper No. 2 was prepared in the same manner as the preparation of the stamper No. 1.

Comparative Example: Stamper No. 3

With the exception of not providing a light absorption layer, a stamper No. 3 was prepared in the same manner as the preparation of the stamper No. 1.

(Evaluation Results 1)

The shape of the uneven pattern formed on each stamper was confirmed by inspection using an AFM (atomic force microscope). A silicon nitride (SiN) probe tip was used for the AFM probe. Measurement was conducted using a non-contact mode, and the variations in atomic force between the sample and the probe were converted to an image.

Figure 3A:
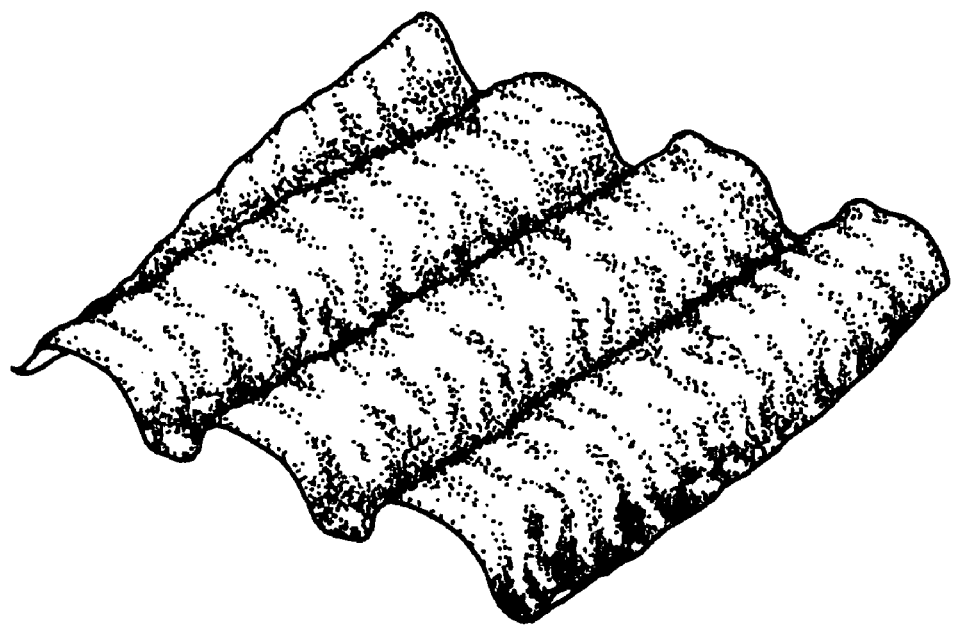
FIG. 3(A) is a diagram showing the result of an AFM analysis of the uneven pattern formed on a stamper according to an example of the present invention.
Figure 3B:
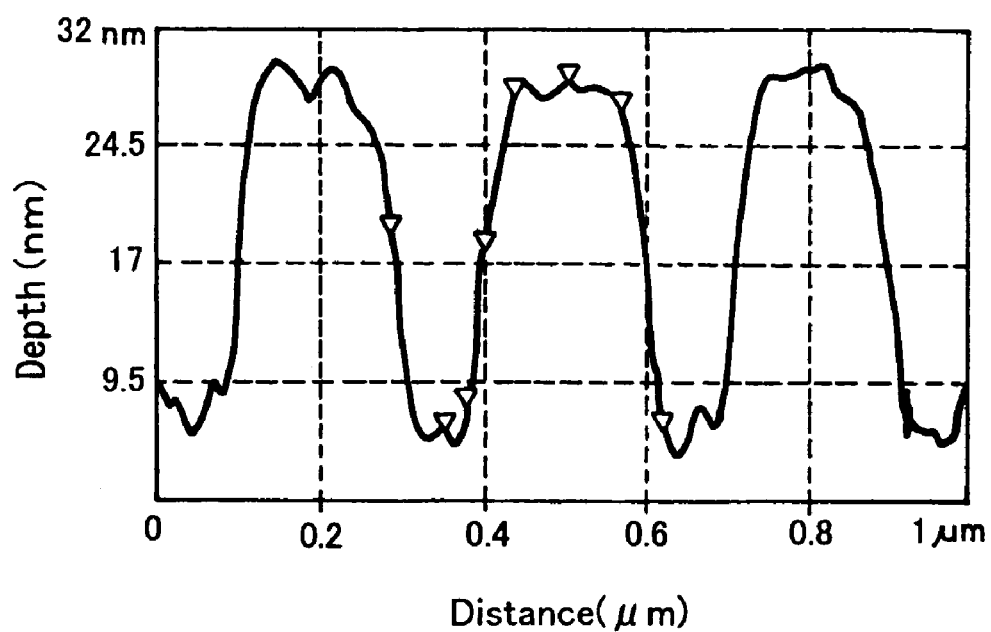
FIG. 3(B) is a line diagram showing the cross-sectional shape of the uneven pattern determined on the basis of the AFM analysis.
Figure 4A:
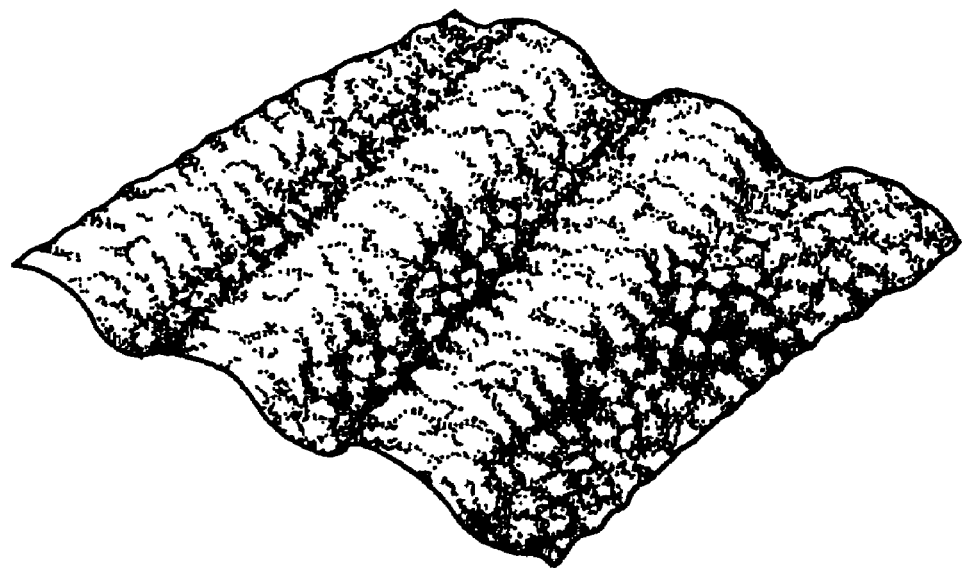
FIG. 4(A) is a diagram showing the result of an AFM analysis of the uneven pattern formed on a stamper according to a comparative example of the present invention.
Figure 4B:
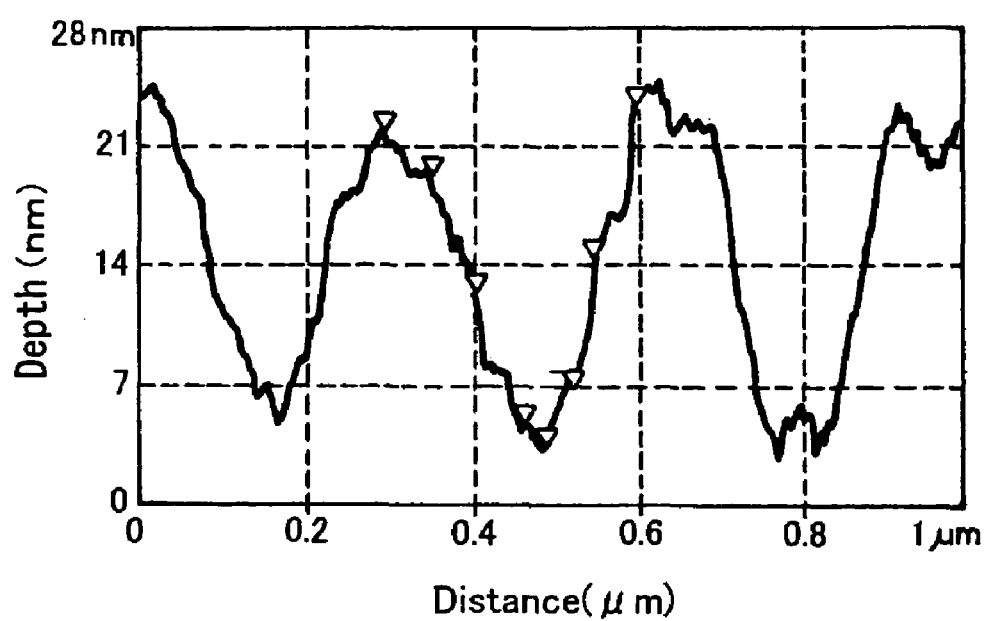
FIG. 4(B) is a line diagram showing the cross-sectional shape of the uneven pattern determined on the basis of the AFM analysis.

FIG. 3(A) shows the AFM image of the stamper No. 1, and FIG. 3(B) is a line diagram showing the cross-sectional shape of the same image. Similarly, FIG. 4(A) shows the AFM image of the stamper No. 3, and FIG. 4(B) is a line diagram showing the cross-sectional shape of the same image. In the AFM images, the dark areas of high dot density represent the concave sections within the uneven patterns, and the areas of low dot density or the white areas represent the convex sections, and these concave and convex sections correspond with the convex and concave sections respectively of the uneven pattern on the photoresist master. In FIG. 3(B) and FIG. 4(B), the uneven patterns are formed with a pitch of 0.32 μm.

As is evident from comparing FIG. 3 and FIG. 4, in the stamper No. 1 that was manufactured in accordance with the present invention, the effect of the light absorption layer resulted in the formation of a sharp pattern, and the effects of the Pd application and the water washing treatment enabled the pattern to be transferred faithfully to the stamper.

(Evaluation Results 2)

Figure 5:
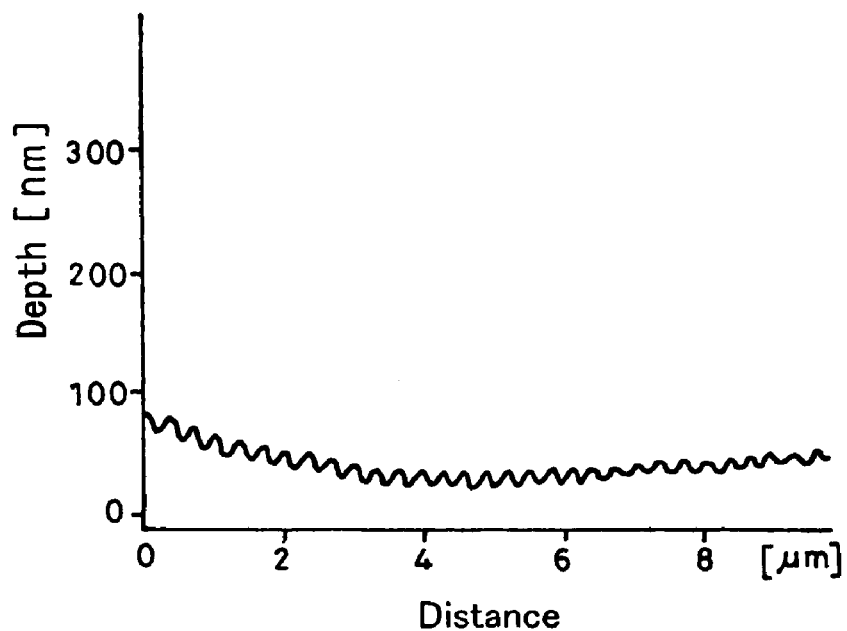
FIG. 5 is a line diagram showing the uneven state of the stamper surface of the above example, as measured by a scanning electron microscope.
Figure 6:
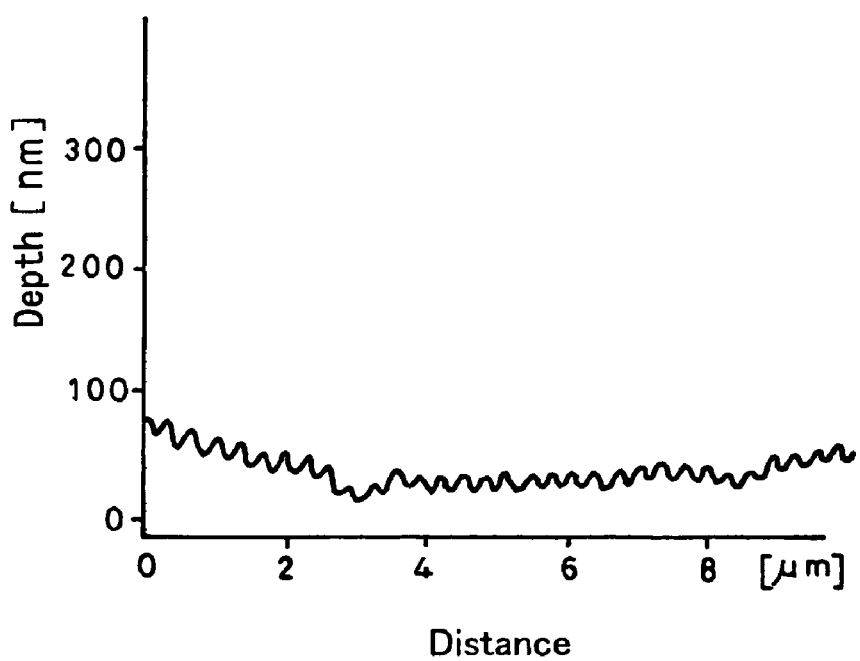
FIG. 6 is a line diagram showing the uneven state of the stamper surface of the above comparative example, as measured by a scanning electron microscope.
Figure 7:
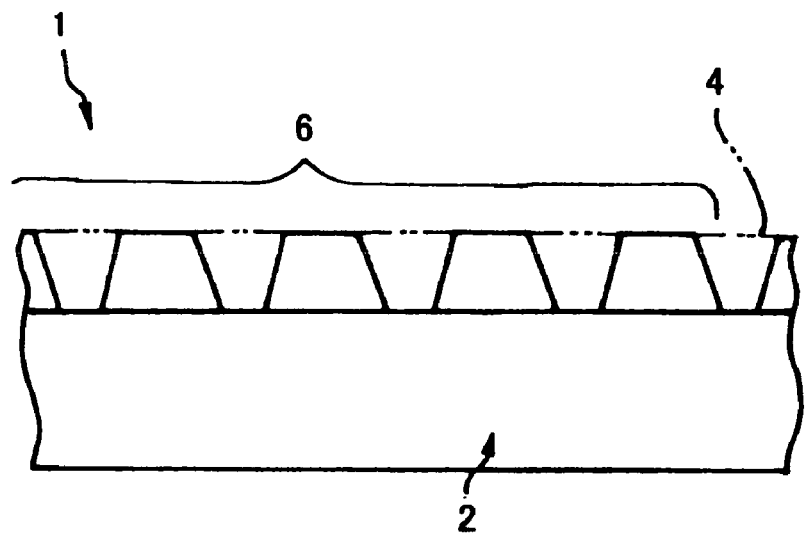
FIG. 7 is a cross-sectional view showing a conventional photoresist master.
Figure 8:
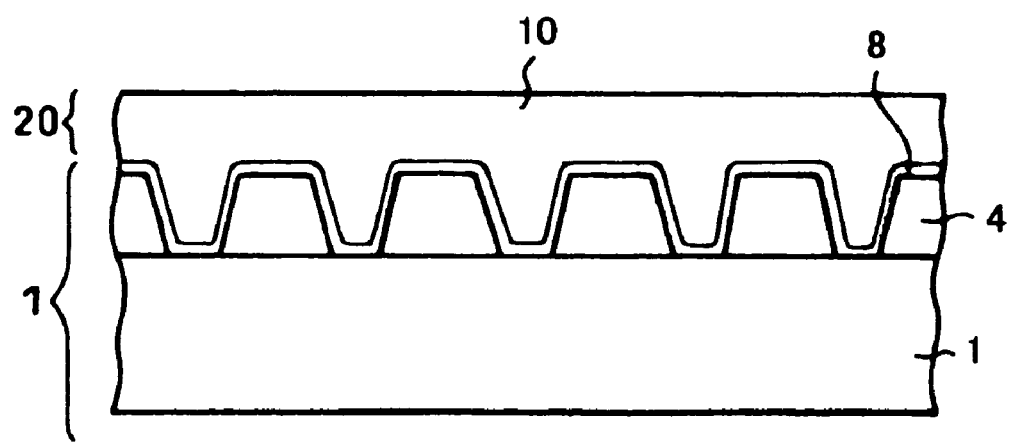
FIG. 8 is a cross-sectional view showing a state during the manufacture of a stamper using the same conventional photoresist master.

The uneven states of the stamper No. 1 and the stamper No. 2, as measured by a scanning electron microscope (10,000×magnification), are shown in FIG. 5 and FIG. 6, respectively. By comparing FIG. 5 and FIG. 6 it is evident that whereas no fine irregularities can be seen for the stamper No. 1, in the stamper No. 2, fine irregularities that appear as indentations with a width of approximately 1 μm are clearly visible at approximately 3 μm and 8.5 μm along the horizontal axis. In FIG. 5 and FIG. 6, the unevennesses that appear with a pitch of approximately 0.3 μm represent the uneven pattern formed in the present invention.

INDUSTRIAL APPLICABILITY

In the present invention, the light absorption layer contacting the photoresist layer enables the formation of a sharp uneven pattern on the photoresist master, and the Pd provided on the surface of this uneven pattern and the subsequent washing process enable the production of a stamper with a pattern surface that is faithful to this uneven pattern.

The invention claimed is:

1. A method of manufacturing a stamper for manufacturing an information medium, comprising the steps of:

manufacturing a photoresist master by forming at least a light absorption layer and a photoresist layer, in that order, on top of a substrate, irradiating light onto said photoresist layer to form a latent image from an opposite surface to that which contacts said light absorption layer, and then developing said latent image to form an uneven pattern;

forming a thin metal film on top of said uneven pattern of said photoresist master;

forming a stamper by forming a metal film on top of said thin metal film, and separating said thin metal film and said metal film from said photoresist master; and providing a metal catalyst on a surface of said uneven pattern after manufacturing the photoresist master, activating said metal catalyst, and then washing the surface of said uneven pattern on which said metal catalyst is provided with a liquid, as preliminary treatments to the step of forming said thin metal film on said photoresist layer.

2. The method of manufacturing a stamper for manufacturing an information medium according to claim 1, wherein pure water is used as said liquid for said washing.

3. A stamper for manufacturing an information medium, in a surface of the stamper an uneven pattern being formed in advance, the stamper being manufactured by the steps of:

manufacturing a photoresist master by forming at least a light absorption layer and a photoresist layer, in that order, on top of a substrate, irradiating light onto said photoresist layer to form a latent image from an opposite surface to that which contacts said light absorption layer, and then developing said latent image to form an uneven pattern; forming a thin metal film on top of said uneven pattern of said photoresist master; forming the stamper by forming a metal film on top of said thin metal film, and separating said thin metal film and said metal film from said photoresist master; and providing a metal catalyst on a surface of said uneven pattern after manufacturing the photoresist master, activating said metal catalyst, and then washing the surface of said uneven pattern on which said metal catalyst is provided with a liquid, as preliminary treatments to the step of forming said thin metal film on said photoresist layer.

4. The stamper according to claim 3, wherein pure water is used as said liquid for said washing.

5. A photoresist master comprising a substrate, a light absorption layer laminated on top of said substrate, and a photoresist layer which is laminated on top of said light absorption layer and having an uneven pattern formed therein by forming and subsequently developing of a latent image, wherein an activated metal catalyst is provided on a surface of said uneven pattern formed in said photoresist layer, and the surface of said uneven pattern on which said metal catalyst has been provided is washed with a liquid.

* * * * *